Figure 1:
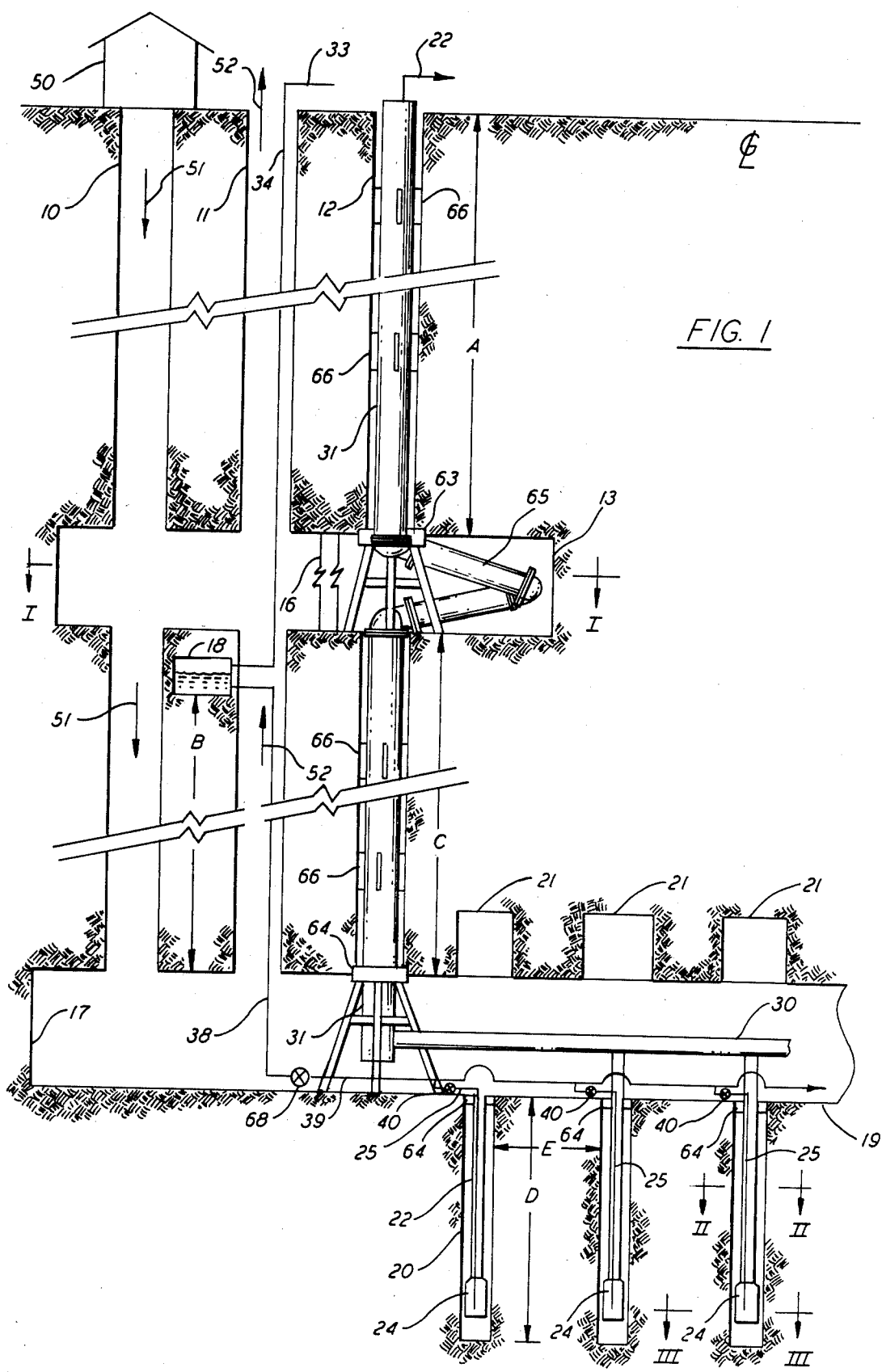

United States Patent [19]

Sederquist

[11] Patent Number: 4,745,756
[45] Date of Patent: May 24, 1988

[54] HDR CLOSED LOOP STEAM GENERATION

[76] Inventor: Robert Sederquist, R.F.D. 4 Box 303, Laconia, N.H. 03246

[21] Appl. No.: 105,717

[22] Filed: Oct. 6, 1987

[51] Int. Cl.$^4$ .............................................. F03G 7/00
[52] U.S. Cl. .................................................. 60/641.2
[58] Field of Search ................ 60/641.2, 641.3, 641.4, 60/641.5

[56] References Cited

U.S. PATENT DOCUMENTS

| | | | |
|---|---|---|---|
| 3,140,986 | 7/1964 | Hubbard | 60/641.2 X |
| 3,379,248 | 4/1968 | Strange | 60/641.2 X |
| 4,044,830 | 8/1977 | Van Huisen | 60/641.2 X |
| 4,060,988 | 10/1977 | Arnold | 60/641.2 |

FOREIGN PATENT DOCUMENTS 586378  3/1977  Switzerland ...................... 60/641.2

Primary Examiner—Allen M. Ostrager
Attorney, Agent, or Firm—Lee A. Strimbeck

[57] ABSTRACT

A HDR closed loop geothermal steam generating system comprises of three large vertical bores driven in solid rock to a depth of 2 to 3 miles and terminating in an enlarged bottom chamber from which a series of horizontal tunnels radiate. A plurality of small bores are then driven down from each horizontal tunnel to a depth where the rock temperature is high enough for steam generation. A steam generating chamber is placed at the foot of each small bore to which feed water is supplied. Steam is piped from the steam generating chambers to a common header in each horizontal tunnel. Each header feeds into a steam riser in one of the large vertical bores which conveys the steam to the surface. Steam condensate is recycled as feed water without the need of pumps.

6 Claims, 2 Drawing Sheets

HDR CLOSED LOOP STEAM GENERATION

This invention pertains to the recovery of geothermal energy, and in particular, relates to a well system for generating steam in a closed loop system for powering a steam turbine electrical generating plant on the surface. This system is closed loop in the sense that the wells are in a solid or continuous volume of hot dry rock (HDR) that by and large excludes or prevents subterranean water from entering into the system. The water used for steam generation can be recycled with little loss and without build up of detrimental mineral content.

PRIOR ART

| U.S. Pat. No. 3,782,468 | Kuwada | Janaury 1, 1974 |
| U.S. Pat. No. 3,875,749 | Baciu | April 8, 1975 |
| U.S. Pat. No. 3,995,429 | Peters | December 7, 1976 |

Major Accomplishments of the Hot Dry Rock Program 1970-1982, Morton C. Smith, U.S. Department of Energy, Division of Geothermal and Hydropower Technologies The publication establishes the basis feasibility of the well system of this invention.

DISCUSSION

One of the main draw backs of most geothermal steam generation schemes that have been proposed is that they require a large number of wells that must be driven to a considerable depth to reach rock temperatures high enough for the steam generation. The expense of doing so is considerable. Many of the schemes are of the opened loop type wherein water and steam together are taken out of the ground, the water is separated and the steam is used to power a turbine. This steam is called "wet steam" as its temperature is not too high. The steam has a considerable amount of disolved minerals in it. After the wet steam is used it is condensed and mixed with the water that came with it from the ground. This mixture is then re-injected back into the ground because it is high in acids and minerals and cannot be used or left on the surface, as it would be too polluting to do so.

As noted above the present system is specifically an HDR closed loop system which does not generate any polluting amounts of waste water and which provides steam that is clean and will not foul the turbine blades.

THIS INVENTION

In brief compass, this invention is a well system for extracting geothermal steam energy from a hot dry rock. Three large diameter bores, spaced in a triangular pattern, are driven at least 2,000 feet into a solid rock formation to a point where the rock temperature is in excess of 100° F. e.g. 130° F. One well is for air supply and contains an elevator, another is a utility well for electrical services, condensate return and the last well is for bringing up the steam. At a level greater than about 2,000 feet an enlarged horizontal chamber is made about the steam bore and two horizontal service bores connect the supply bore to the utility bore, and the utility bore to the steam bore. Blast doors are placed in the horiziontal bore connecting the utility and steam bores.

The three vertical bores terminate in a common bottom chamber. A series of horizontal tunnels radiate out of the bottom chamber in a star pattern, a distance of at least 1,500 feet each, to give a large underground "footprint". Each horizontal tunnel then has a series of small bores extending therefrom a substantial distance—one mile or more—to an area in the rock formation where the temperature is sufficient for steam generation, preferably above 500° F.

The small bores of, say, 12 inch diameter contain small insulated pipes having an internal diameter (I.D.) of 4 inches, that descend to and terminate in steam generating chambers at the bottom of the bores. The chambers are at least 600 feet, preferable at least 1,000 feet long. Each horizontal tunnel contains a steam header to which the insulated pipes coming into the tunnels connect. The steam headers then connect with a large diameter riser in the steam bore that carries the steam to the surface.

Condenser water from the power plant on the surface is piped down through the utility bore to headers that carry out into each of the tunnels. From these headers, small lines, e.g. $\frac{3}{8}$ to $\frac{1}{2}$ inch I.D., carry the water down each small bore adjacent the steam pipe therein to the steam generating chamber and on to within 40 feet or so the bottom thereof.

At or near the surface, the condensate passes through an approximately 40 foot barometric loop to maintain a vacuum seal on the condenser. The condensate then falls to a feed water storage tank at a level of about 2,000 feet above the bottom chamber. This maintains a greater water pressure than steam pressure. From the storage tank the feed water passes to the headers in the horizontal tunnels and thence, to the individual wells. As the water flows downhill and the steam exhaust uphill, considering the vertical distance involved, no injection pumps or feed pumps are required.

The savings afforded by the well system of this invention are considerable. The three large vertical bores can go down to a depth of perhaps 2½ to 3½ miles, or when a rock temperature of 130° F. is reached. At this point, the bottom chamber is excavated and the horizontal tunnels are extended outwardly in a star pattern. From this point the individual small bore steam generating wells may only have to penetrate downward another mile or so to reach steam generation temperatures. The number of individual wells will be determined by the steam plant requirements. The savings in individual wells will be realized in the reduced mileage of the wells that have to be drilled. For example, 300 small wells might be needed to supply a sufficient amount of steam for a large size generating station and if all were drilled from the surface to a depth of 6 miles, 1,800 miles of drilling would be required whereas with the present well system, perhaps only 300-600 miles of drilling might be required for the small wells.

The greater the depth of penetration to the underground chamber, the greater will be the savings.

DRAWINGS

Figure 2:
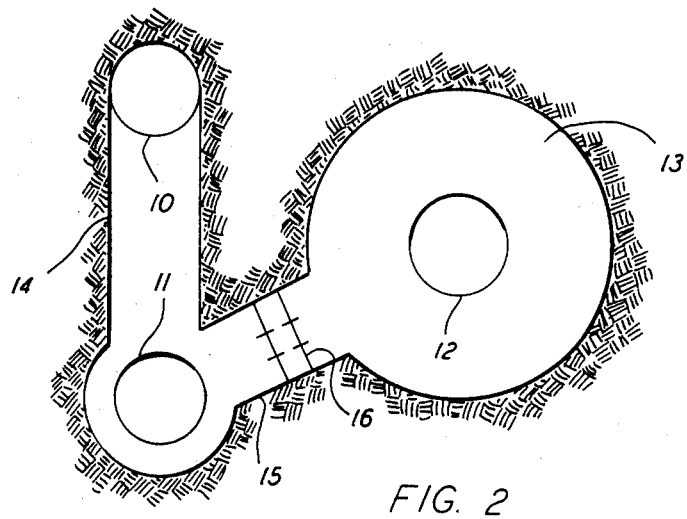
Figure 3:
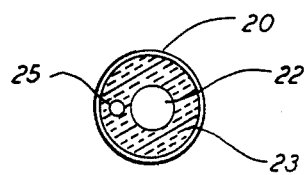
Figure 4:
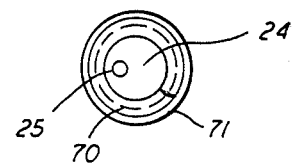

In the drawings:
FIG. 1. is a schematic elevation view, not to scale, of the well system of this invention;
FIG. 2. is a cross section of FIG. 1 taken along I—I;
FIG. 3. is a cross section taken along line II—II of FIG. 1; and
FIG. 4. is a cross sectional view taken along line III—III of FIG. 1.

DESCRIPTION

Referring to FIG. 1, three large diameter bores, 10,11 and 12, at least 8 feet in diameter and spread at least 150 feet apart, are drilled in a volume of solid rock by known methods. Bore 10 is the supply bore, bore 11 is the utility bore and bore 12 is the steam bore. They are drilled in a triangular surface pattern and descended to an enlarged chamber 13 that is at an intermediate level of perhaps 2,000 feet, dimension A on the drawing. It can have a height of 75 feet or so. Chamber 13 is primarily around the steam bore to accommodate the piping necessary for an expansion joint. Two horizontal access bores, 14 and 15, at least 8 feet in diameter connect the supply bore to the utility bore and the utility bore to the steam bore, respectively (see FIG. 2). Preferably, horizontal bore 15 contains blast doors 16 as a safety measure so that the supply bore and utility bore can be isolated if the steam line should rupture.

From the intermediate chamber 13, the large bores descend to a bottom chamber 17 which may also have a height of 75 feet. This may be at a depth (dimension C) of several thousand feet or so below immediate chamber 13. The overall depth of the bottom chamber may be as much as 2½ to 3½ miles.

At a level preferably at least 2,000 feet (dimension B), above the bottom chamber there is a chamber 18 for a feed water storage.

From bottom chamber 17, a plurality e.g. 12, lateral tunnels 19 radiate outwardly with most of them preferably having a length exceeding 1,500 feet and a diameter of at least 8 feet. A series of small wells having a diameter of, for example 12 inches descend from these lateral tunnels, down through the rock to a depth where the temperature is sufficient for steam generation, preferably at least 500° F. There are preferably at least 3 of these small down bores in each tunnel and a tunnel may contain as many as 40 or 50. They are spaced (dimension E) preferably at least 100 feet apart. To permit drilling of the bores 20, a working chamber 21 is excavated above each well along the length of tunnel 19. These domes may have a height of 75 feet or so.

A small pipe 22 is placed in each of the bores 20. Pipe 22 has an I.D. of less than half the diameter of the bore, e.g. 4 inches, has preferably insulation 23 there about, and extends down towards the bottom of the bore and ends 1,000 feet or so from the bottom at a steam generating chamber 24. Chamber 24 comprise enclosed cylinders 71 which fit within bores 20 and receive lines 22 and 25.

Steam from the steam generating chambers 24 are carried by pipes 22 up to a header 30 in the lateral tunnels which headers 30 connect to the main steam riser 31 in bore 12. The steam from riser 31 is then conveyed by line 32 to the power generating plant (not shown), which can be for example a conventional steam turbine electrical generator plant. This plant is of conventional construction and does not form a part of this invention. Therefore it is not illustrated. The steam from line 32 could be used for other purposes, of course, such as space heating or in industrial processes such as in a canning factory.

The steam, when spent, is condensed in a known manner and returned to the system by line 33 as water. It will be desirable to use triply distilled water to fill and maintain the system so as to keep contaminates in the water as low as possible. The condensate descends by line 34 to the feed water chamber 18. This chamber accommodates the make up feed water for the system. From feed water chamber 18 the condensate flows by line 38 to headers 39 in each of the lateral tunnels 19. The condensate then passes by solenoid valves 40 to the small diameter lines 25 that lead to the steam generating chambers 24.

Bore 10 contains a service elevator of conventional design (not illustrated) and may have a suitable control building 50 at the top thereof. Air is supplied by line 51 to the well system by bore 10. The air exhaust, illustrated by flow line 52 in bore 11.

There may be more than one immediate chamber 13. At the floor of each immediate chamber 13 the vertical piping is solidly supported on the rock floor. Supports 63 and 64 hold steam riser 31. This permits it to expand upwardly in the bores. The expansion of the steam riser 31 will be considerable and for this reason, in each of the immediate chambers 13 a good sized expansion connection 65 is provided. Guide fins 66 are placed on riser 31. These slide up and down within bore 12 along with the riser and guide and brace it.

The small diameter bores reaching to the steam generating chambers 24 are suspended from the floor of the lateral tunnels by blocks 64. As previous indicated the length (dimension D of the drawing) of the small bore holes can be considerable and the length of the piping 22 therein, could vary as much as 500 feet or more as a hole is taken in and out of service. For this reason, pipes 22 and chambers 24 stop short of the end of the bore hole by a distance of 600 feet or more to assure that the pipe is not damaged by reason of the thermal expansion.

The condensate line 25 runs to within 30–40 feet of the bottom of the steam generating chamber 24 where it discharges its water. The water is converted to steam by the temperature of the hot rock and rises up to and through pipe 22. Preferably the steam generator chambers 24 has spiral troughs (FIG. 4) 70 to effect separation of water and steam in a cyclonic fashion as the steam rises up through the chamber.

Each of the lines 22 have two electrically operated steam valves (not shown) to isolate the lines from header 30 and each header 30 has two electrically operated steam valves to isolate it from riser 31. Thus, individual wells and/or lateral lines can be shut off as required. Control of the generation of steam is effected by means of the solenoid valves 40 in the feed water lines which regulate the amount of water allowed to flow into an individual well. When desired, the water flow can be shut off completely to withdraw a particular well from production.

What is claimed is:

1. A well system for extracting geothermal steam energy from hot dry rock comprising in combination:
    (1) Three vertical bores into the earth spaced apart by a distance of at least 150 feet in a triangular pattern and being at least eight feet in diameter each, said bores being driven to at least 2,000 feet and terminating in a solid rock formation at a point where the rock temperature exceeds 100° F, said wells being designated respectively supply, utility and steam;
    (2) At at least one level greater than 2,000 feet, an enlarged horizontal chamber about said steam bore and two horizontal bores each at least 8 feet in diameter, one connecting said supply bore to said utility bore and the other connecting said utility bore to said steam bore;

(3) A common bottom chamber into said which said bores terminate;

(4) A series of horizontal tunnels, each at least 8 feet in diameter, radiating out from said bottom chamber a distance of at least 1,500 feet each; and (5) Each of said horizontal tunnels having at least three small bores less than two feet in diameter, descending therefrom to a depth of at least 1 mile there below and to a point where the rock temperature exceeds 500° F.

2. The well system of claim 1 wherein there is a blast door in said horizontal bore connecting said utility and steam bores.

3. The well system of claim 1 wherein:

(6) Each said small bore contains an insulated pipe having an internal diameter of less than ½ of the diameter of the bore and that terminates in a steam generating chamber at least 600 feet long at the foot of said small bore;

(7) Each said horizontal tunnel containing a steam header to which each said insulated pipe for the respective tunnel connects; and (8) Said steam bore containing a vertical steam riser to which said header connects, there being an expansion joint in said steam riser in said enlarged horizontal chamber and said steam riser being supported on the floors of said enlarged horizontal chamber and said common bottom chamber, permitting thereby expansion and contraction to occur at said expansion joint.

4. The well system of claim 3 wherein there is a feed water chamber at least 2,000 feet above said common bottom chamber and connecting with said utility bore, and wherein there is a feed water line extending from the surface to said feed water chamber and from said feed water chamber through feed water headers to each of said small bores, said small bores having down-flow pipes of less than 1 inch in diameter extending and discharging into the base of said steam generating chambers the upper end of each of which connects to one of said feed water headers.

5. The well system of claim 4 wherein each of said horizontal tunnels have at least three of said small bores spaced at least 100 feet apart.

6. The well system of claim 1 wherein said steam bore contains a large diameter steam line, said supply bore contains an elevator, said utilities bore contains a feed water return line and electrical service, and said supply and utilities bores contain means for air supply and exhaust for said well system.

* * * * *